United States Patent [19]
Giacometti et al.

[11] Patent Number: 5,351,504
[45] Date of Patent: Oct. 4, 1994

[54] HEAT PUMP FOR HEATING OR REFRIGERATING BUILDINGS AND DELIVERING IN COMBINATION HOT WATER FOR SANITARY FIXTURES

[75] Inventors: Paolo Giacometti; Carlo Mustacchi; Vincenzo Cena, all of Rome, Italy

[73] Assignee: Ente Per Le Nuove Tecnologie, L'Energia E L'Ambiente (ENEA), Rome, Italy

[21] Appl. No.: 898,943

[22] Filed: Jun. 15, 1992

[30] Foreign Application Priority Data

| Jun. 13, 1991 | [IT] | Italy | 000421 A/91 |
| Jun. 13, 1991 | [IT] | Italy | 000422 A/91 |
| Jun. 13, 1991 | [IT] | Italy | 000423 A/91 |

[51] Int. Cl.$^5$ ............................................. F25B 15/00
[52] U.S. Cl. .......................................... 62/476; 62/484; 62/105
[58] Field of Search ................... 62/476, 101, 105, 104, 62/483, 484, 485, 238.3, 324.2

[56] References Cited

U.S. PATENT DOCUMENTS

| Re. 10,725 | 5/1886 | Hendrick | 62/238.3 |
| 2,212,869 | 8/1940 | Tornquist | 257/7 |
| 2,287,441 | 6/1942 | McGinnis | 62/5 |
| 2,559,217 | 7/1951 | Kehoe | 62/238.3 |
| 3,527,061 | 9/1970 | Kruggel | 62/142 |
| 4,207,751 | 6/1980 | Kampfenkel et al. | 62/141 |
| 4,368,624 | 1/1983 | Takeshita | 62/238.3 |
| 4,383,416 | 5/1983 | Phillips | 62/101 |
| 4,542,628 | 9/1985 | Sarkisian et al. | 62/335 |
| 4,573,330 | 3/1986 | Van der Sluys et al. | 62/476 |
| 4,972,679 | 11/1990 | Petty et al. | 62/238 |

FOREIGN PATENT DOCUMENTS

| 0128614 | 5/1984 | European Pat. Off. |
| 718956 | 5/1942 | Fed. Rep. of Germany |
| 3127836 | 2/1983 | Fed. Rep. of Germany |
| 798170 | 7/1958 | United Kingdom |
| 2039017 | 12/1979 | United Kingdom |
| 2076304 | 12/1981 | United Kingdom |

Primary Examiner—Henry A. Bennet
Assistant Examiner—William C. Doerrler
Attorney, Agent, or Firm—Stevens, Davis, Miller & Mosher

[57] ABSTRACT

A reversible heat pump providing a generator of refrigerant fluid in a vapor state produced by a rectifying column having perforated plates, with a hydrostatic head on the plate assured by the surface tension of the liquid, a reboiler of the generator heated indirectly, a storage tank of the condensed refrigerant fluid which contributes to controlling the cycle pressure for optimizing the efficiency under partial load conditions, expansion valve for the condensed refrigerant which changes the flow section as a function of the pressure and controls the flow rate of the refrigerant for draining any impurity, electro valve reducing the load loss of the expansion valve during summer, a plate absorber with swirl grid providing a microdrop flow between poor solution and refrigerant, and a multi-way valve which allows the heat pump to be coupled with a split-exchanger by deviating the flows of the operating fluids according to the requirements so as to cause the split-exchanger to perform the function of a cold source during winter and the function of a hot drain during summer.

28 Claims, 13 Drawing Sheets

∅ >7÷8mm

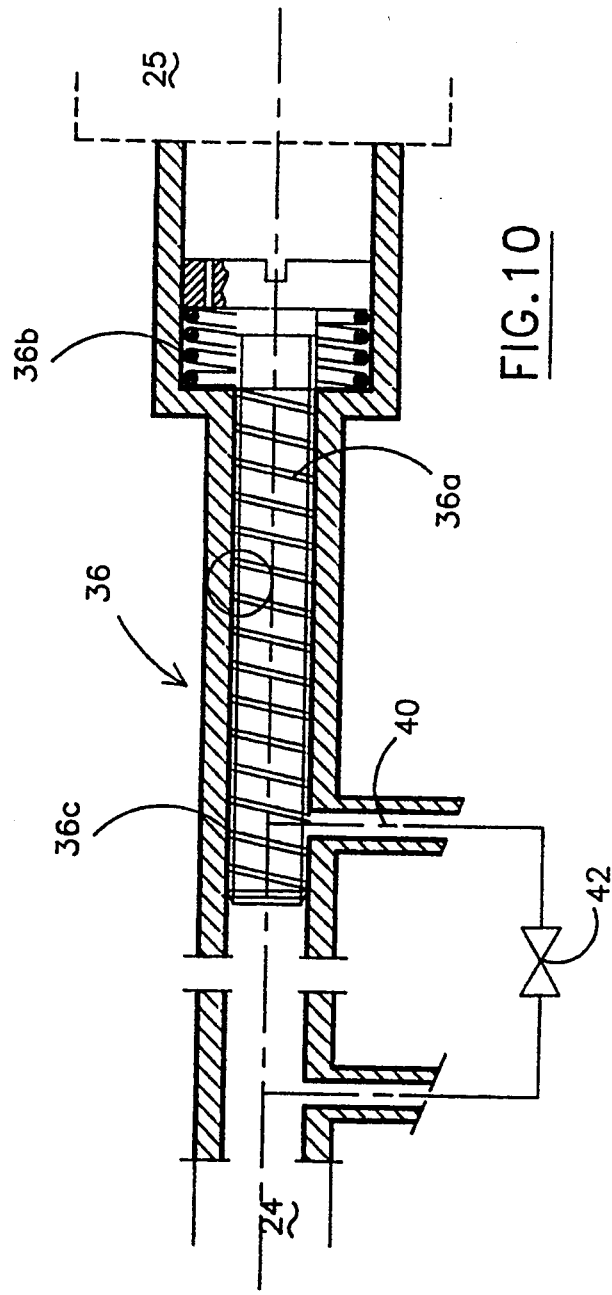
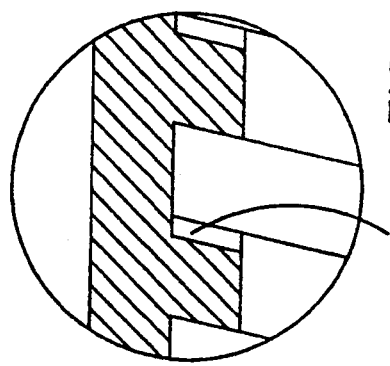
FIG. 10
FIG. 10a

COLD SOURCE
OR HOT DRAIN

HEAT PUMP FOR HEATING OR REFRIGERATING BUILDINGS AND DELIVERING IN COMBINATION HOT WATER FOR SANITARY FIXTURES

The present invention relates to a reversible heat pump capable of heating or refrigerating buildings and delivering in combination hot water for sanitary fixtures.

The heat pump of the invention is of the absorption type, the energy source of which is a primary energy source such as natural gas, and is intended to meet the heating and refrigerating requirements in the field of the absorption heat pumps (AHP) of mean power rating between 10 and 100 kW.

As known heat pump is an apparatus which transfers heat from one thermal level to a second higher thermal level at the cost of energy consumption. Such apparatus allows theoretically a certain amount of thermal energy equal to the sum of the energy delivered to the environment and the energy taken therefrom to be delivered to the user.

Heat pumps can be of the mechanical type (compressor) operated by an electric or mechanical motor or a thermal absorption motor.

The novel interest in the absorption heat pump is due to the following requirements:
a) diversifying the use of the energy sources (oil, methane, a.s.o.) both for decreasing the peak load in the power plants and best using the surplus deliveries of natural gas during summer;
b) decreasing the pollution due to the use of coal as AHP consume less than electric heat pumps or boilers with the same continuous yearly performance.

According to the conventional design a single-stage absorption heat pump with recovery of heat includes the following components: a generator for the production of the process fluid in the vapor state by heating said generator; a condenser of the process fluid; a valve for the process liquid; an evaporator where the process fluid evaporates and subtracts heat from the environment at low temperature; a subcooler for recovering heat in order to improve the cycle efficiency; an absorber for dissolving the process fluid under the vapor state and high enthalpy in the poor solution from the generator; a near saturated solution pump for supplying the generator in order to switch off the thermo-dynamic cycle. In addition, a normal single-stage heat recovery cycle is provided with a heat exchanger between poor and near saturated solutions to enhance the performance.

Heat is subtracted from or delivered to the cycle by process fluids.

Heat from the refrigerating circuit is used only for the heating during winter or for producing hot water.

Heat delivered to the evaporator during winter is a thermal comfort for the user while during summer that heat is subtracted from the room to be refrigerated.

The present heat pumps provides the above mentioned cycle by the following technological solutions:
the operative fluids can be either liquid or gaseous;
the cold sources can be air, water of any source or ground.

According to the combined selection of process fluids and source the commercial heat pump is referred to as water-water pump, water-air pump, air-water pump, or air-air pump. The most common pumps are water-water pump and water-air pump.

Process fluids of the commercial pumps are water-ammonia or water-lithium bromide.

Commercial AHPs of mean power rating such as that of the present invention are based upon the technology developed by Arkla Servel, an U.S.A. Company.

Heat is delivered either directly by a gas burner with fire contacting the reboiler of the generator or by circulating hot water produced by a conventional boiler.

All of the components except for the solution pump are substantially heat and/or matter exchangers handicraft-manufactured by the technique of coaxial pipes.

However, such solutions involve a number of troubles which have delayed the entry on the market, namely:
excessive weight, volume and cost;
the impossibility for the user to utilize AHPs for the production of heat and cold without specialist's help;
the potential danger due to fire contacting a container under pressure in case of a water-ammonia AHP or the necessity of providing two boilers plus two refrigerators in case of water-lithium bromide AHPs.

The present invention seeks to find a solution for the above mentioned drawbacks by disclosing a combined, reversible absorption heat pump capable to provide an environment summer/winter conditioning, and to supply hot water for sanitary fixtures at any time, the management of which can be related to the use of a wall boiler. This is achieved by providing an AHP having a simple summer-winter switching device (multi-way valve) which can be directly controlled by the user and the operation of which can be reversed. Namely such device is adapted to supply the user according to his needs with heat and cold, and hot water at a limited cost, reduced weight and dimension, and under higher efficiency and safety conditions.

Selected process fluid is the water-ammonia solution allowing at the same time the user to be supplied with delivery water at high temperature and the evaporator to operate with water at a temperature quite lower than the water freezing point, further providing a high heat of vaporization. The generator of the ammonia vapor consists of a reboiler, a rectifying column having perforated plates and hydrostatic head, and a partial condenser socalled dephlegmator having high efficiency features.

The peculiarity of the hydrostatic head over the rectifying plates aims at assuring the enthalpic liquid/vapor exchange and then providing a greater efficiency in rectifying ammonia vapor. Thus it is further provided a rectifying system capable to reach very quickly the steady state. In other words, unlike all of the systems used today in the rectifying processes of a solute dissolved in a solvent, the apparatus allows the operation to be switched off or the flow rate to be choked after the first starting without repeating the operation necessary to reach again the steady condition for optimizing the separation of the distillate.

Indirect heating of the process fluid has been further resorted to by providing a natural circulation through a double phase change of the thermal carrier fluid, which besides allowing a technologically reliable, low-cost component (commercial boiler) to be used aims at minimizing some problems relative to container under pressure contacting fire by referring such problems to those provided for the manufacturing of the wall boilers. The selected thermal carrier fluid is propylene glycol, a not harmful, selfextinguishing compound.

Such component is in practice provided by lining the bottom of the reboiler with a tank where the vapor of propylene glycol produced by a wall gas boiler condenses; alternatively, the use of a compact exchanger similar to the other exchangers is proposed.

It can be finally used a plate absorber provided with swirl grid aiming at providing a flow of microdrops between poor solution and NH₃ vapor for optimizing heat and matter exchange in the compact exchangers.

Further features and advantages of the present invenzione will now be apparent from the following description with reference to the accompanying drawings, in which:

FIG. 10 shows schematically the valve device;

FIG. 10a shows in particular the clearance between male and female threads of the device of FIG. 10;

Figure 1:
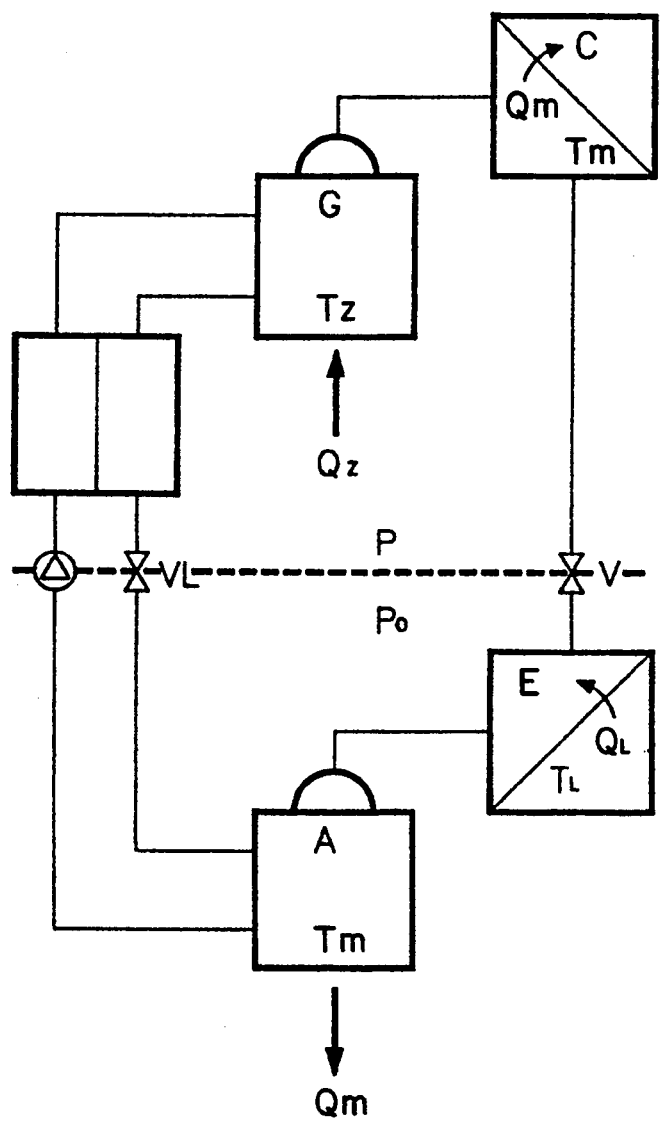
FIG. 1 is a basic diagram of the single-stage absorption heat pumps with recovery of inner heat.

With reference to FIG. 1 showing the traditional diagram of an absorption heat pump, the pure processing fluid condensed at C (condenser), expanded at V (expansion valve), and evaporated at E (evaporator), is first absorbed in a solution A (absorber) with development of heat and then, after pumping, desorbed from the same solution at G (generator) through heating by an outer energy source.

Figure 2:
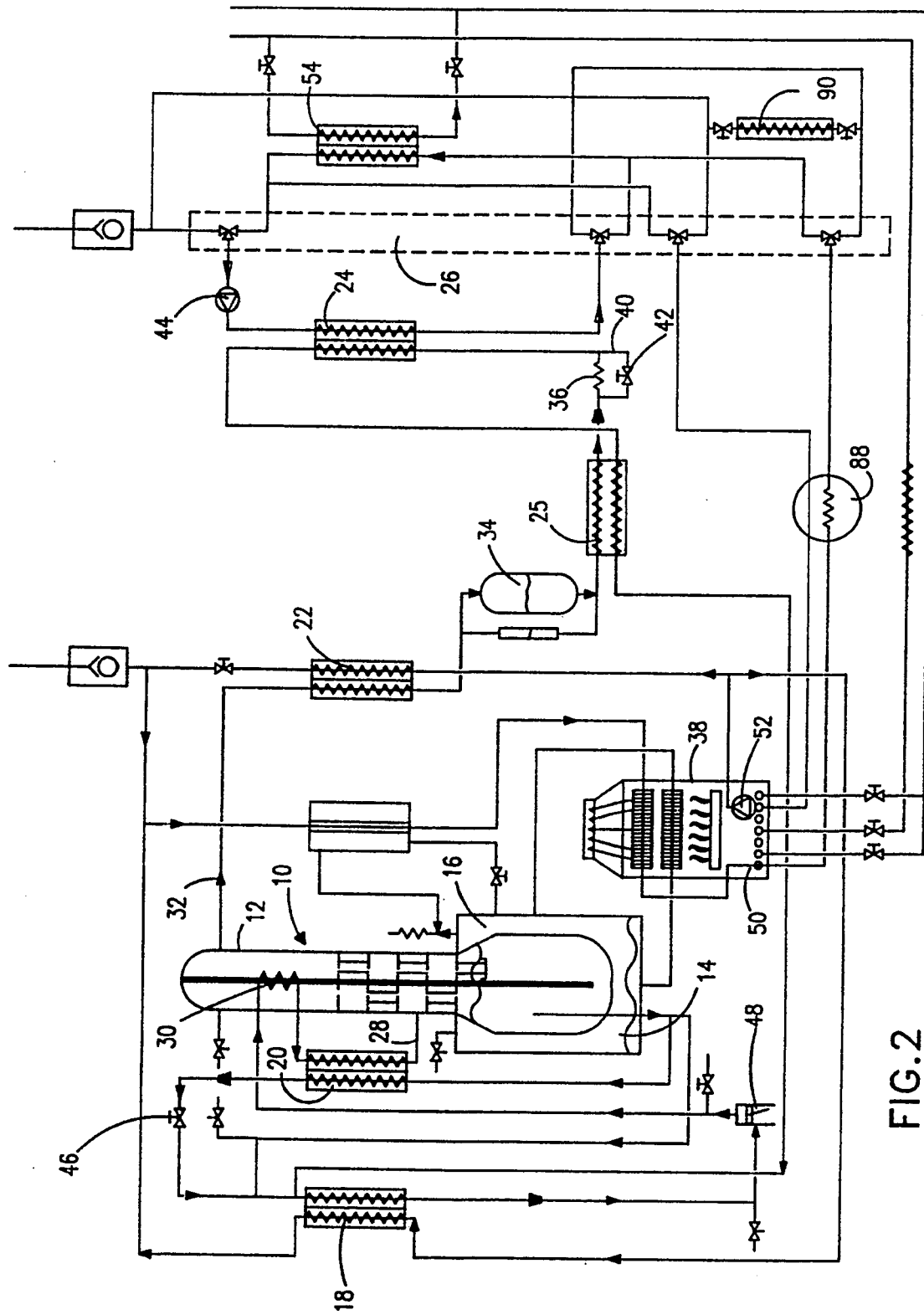
FIG. 2 is a process diagram of the absorption heat pump according to the present invention.

A single-stage, water-ammonia heat pump of the water-water type arranged for air according to the invention is shown in the diagram of FIG. 2.

It substantially includes: a vapor generator 10 formed of a rectifying plate column 12 with a dephlegmator 30 and a reboiler 14, a heat generator 38 supplying reboiler 14 with heat, a condenser 22 of the vapor, a tank 34 for receiving the condensate, a subcooler 25, valve means 36 for the condensate, a device 40 for reducing the load loss of said valve means during summer, an evaporator 24 where the processing fluid receiving heat from a low temperature source evaporates again, an absorber 18 where the pure processing fluid is absorbed by the poor solution from the bottom of the generator, valve means 46 for the poor solution, a solution exchanger 20 and a pump 48 for delivering the near saturated solution from the absorber to dephlegmator 30.

Figure 3:
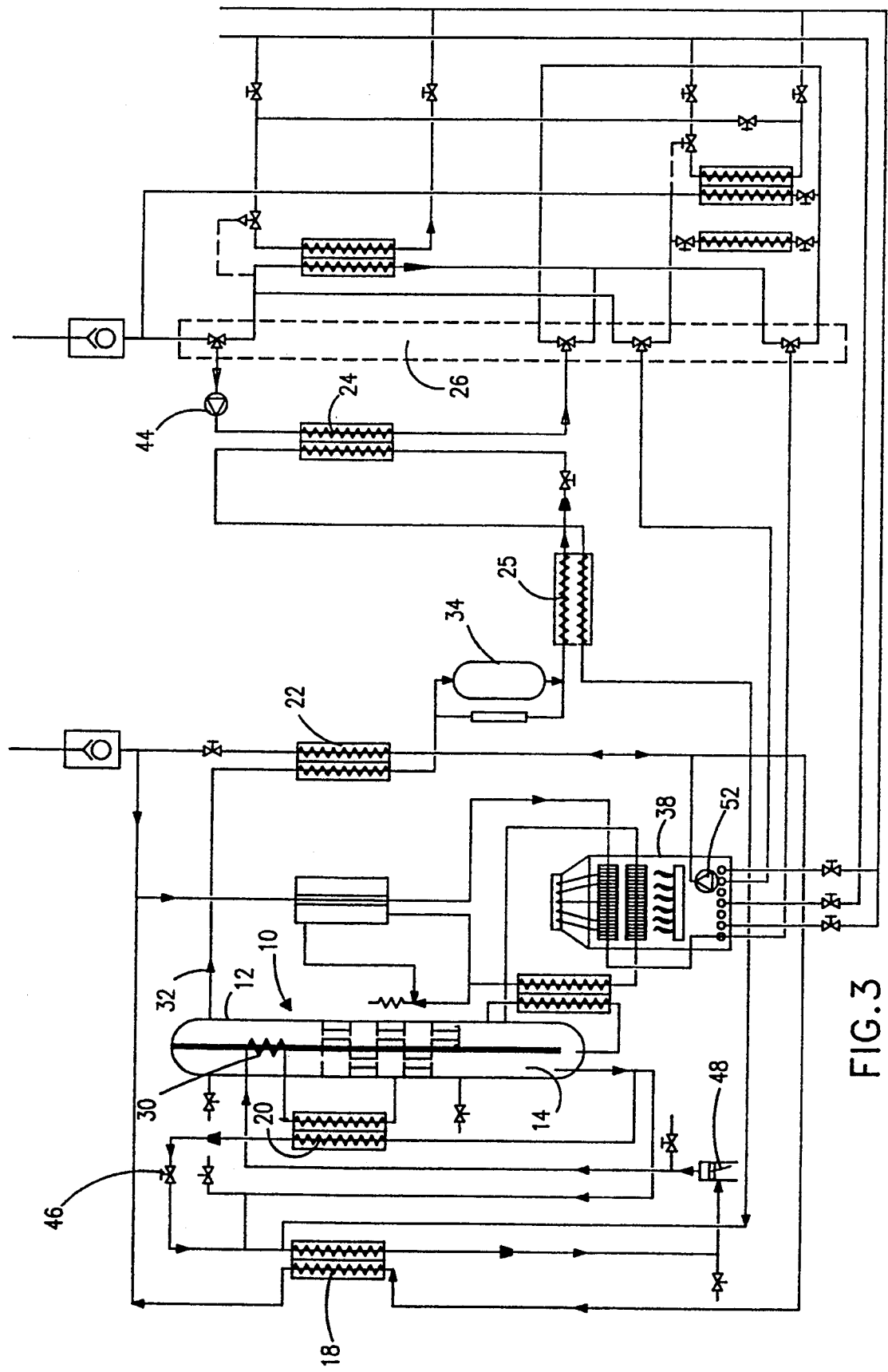
FIG. 3 shows the same diagram as FIG. 2 where the reboiler is heated by a compact exchanger.

In the embodiment of FIG. 2 the heating of reboiler 14 is carried out indirectly as the bottom thereof is covered by a tank 16 onto which propylene glycol vapors produced by a wall gas boiler 38 condense. Alternatively, as shown in FIG. 3, a compact exchanger of the same type as the other exchanger can also be used.

The heat delivered to reboiler 14 produces a certain amount of vapor which flows through the holes of the different plates of the rectifying column 12 in countercurrent with the feed liquid (near saturated solution) of line 28. Through succesive enthalpic exchanges occurring among plates and the partial condensation due to the dephlegmator 30 a pure or almost pure (99,6%) processing fluid (ammonia) is achieved at the outlet of the column head.

According to a characteristic of the present invention the plates of rectifying column 12 have a hydrostatic head provided by the use in combination of two phenomena such as the surface tension of the liquid and the non-wettability of the material forming the rectifying plate.

From the researches about the dripping from perforated plates the inventors have found that such quantities contribute with an inversely proportional ratio with respect to the section of the holes of the plate to increase the hydrostatic head according to the formula:

$$h = -2\sigma \cos \alpha / r \delta g$$

where:
$\sigma$ = surface tension, J/m²
h = raising of the liquid level, m
$\alpha$ = angle of contact between pipe and liquid
g = gravitational acceleration, m/s²
$\delta$ = density of the liquid, kg/m³
r = radius of the capillary (hole), m The analysis of such expression brought to the conclusion that the head on the plates of the column can be assured only by manufacturing the plates with waterproofing material, and on the same diameter of the hole the head will be as much higher the more the value of $\alpha$ tends to 180°.

Figure 4:
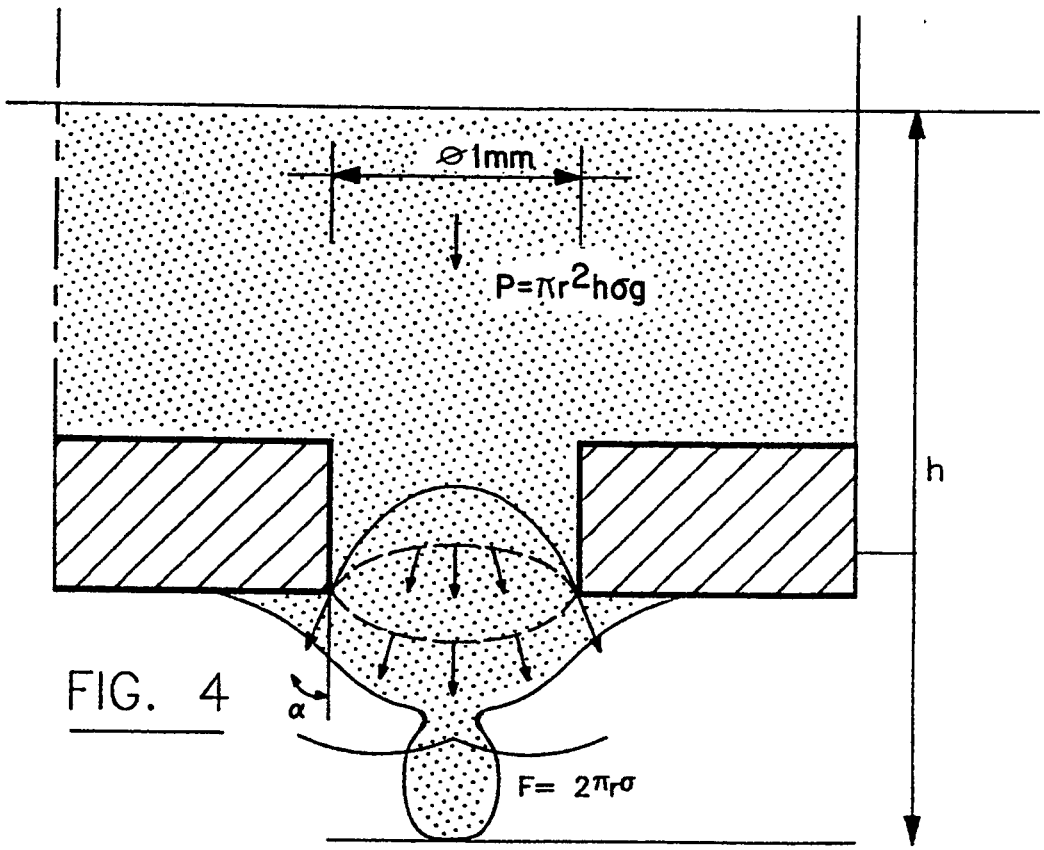
FIG. 4 shows the equilibrium state of a drop on a perforated plate having wettable surface.
Figures 6A, 6B:
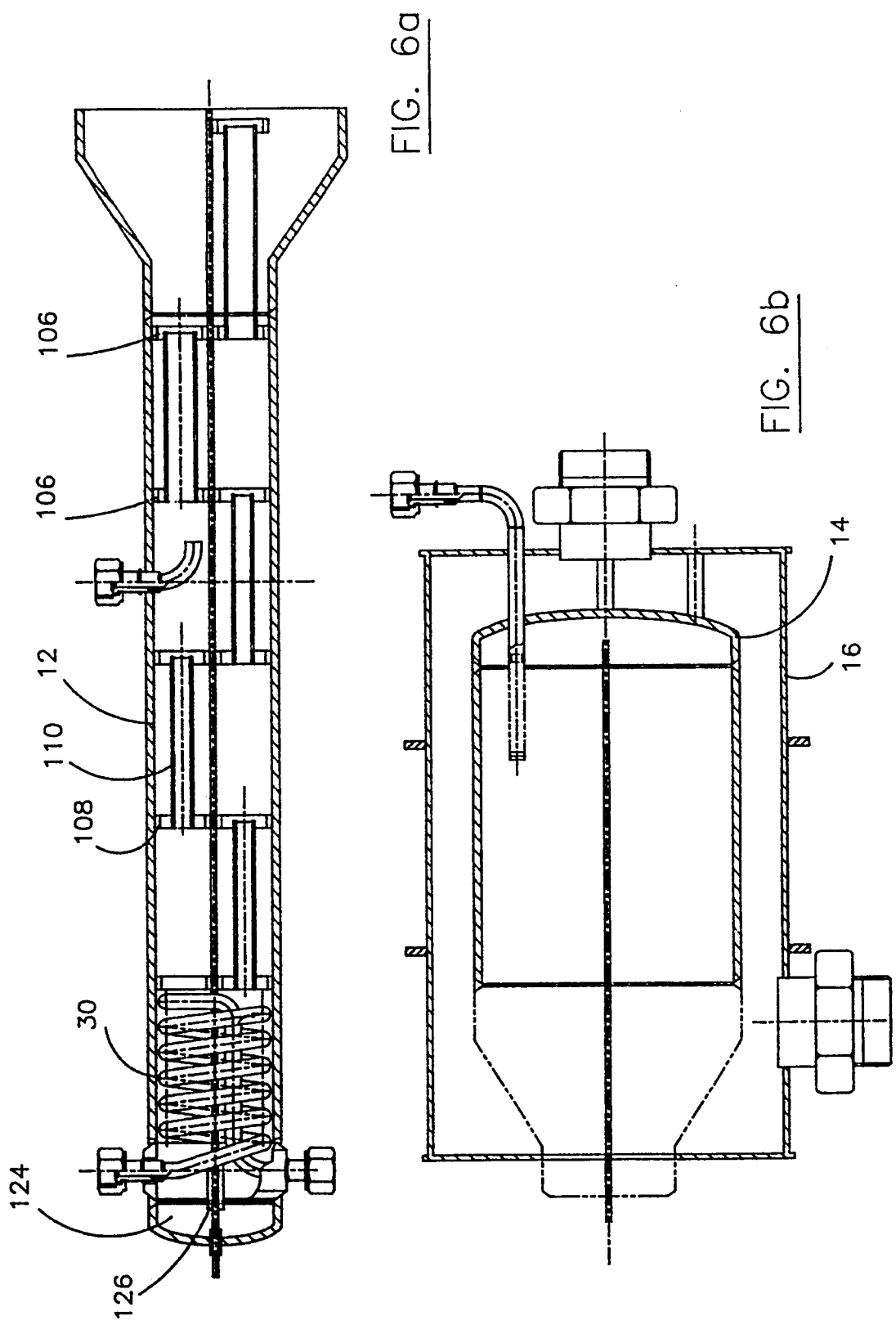
FIGS. 6a and 6b are longitudinal section of the rectfying column and the reboiler of the apparatus according to the invention, respectively.
Figure 8:
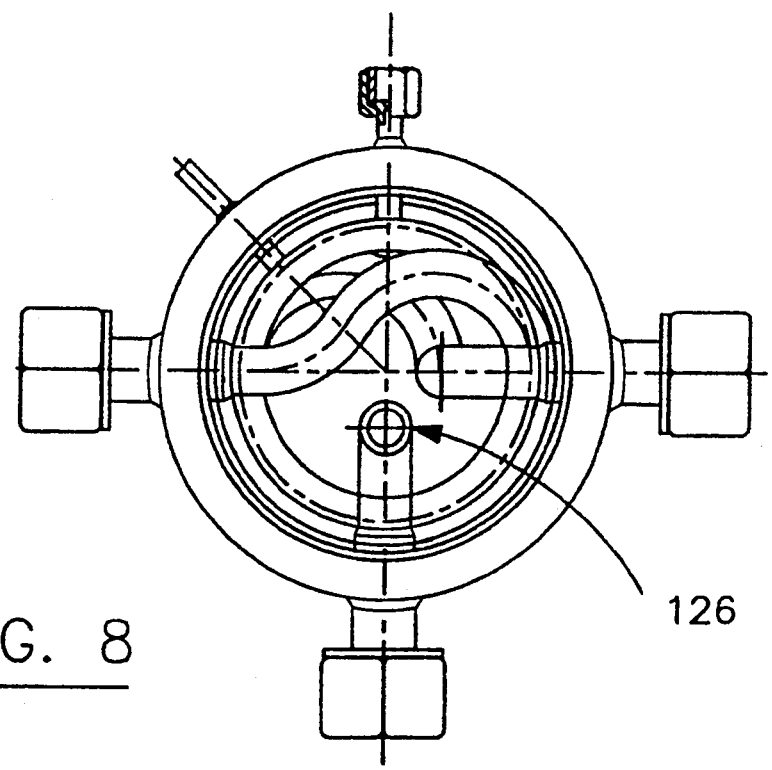
FIG. 8 is a top plan view of the same.

With reference to FIG. 4 in a perforated plate of the conventional type there is no dripping only under optimum steady state because the vapor current balances the thrust of the liquid head downwards. In case of transient conditions or when the reflux is short the hydrostatic head "h" is not assured as both the weight of the head and the wettability of the surface by the process liquid contribute to the emptying.

Figure 5:
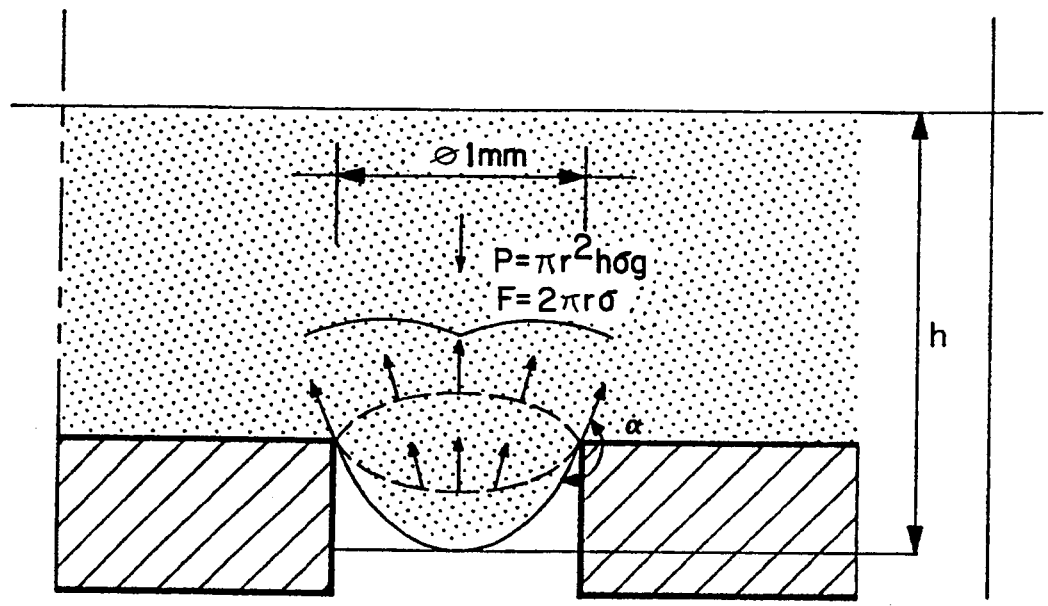
FIG. 5 shows the equilibrium state of a drop on a perforated plate having water-proofing surface according to the invention.

If conversely the surface of the perforated plate is manufactured with water-proofing material, the equilibrium state is as shown in FIG. 5 where independently of the vapor flow the force $F = 2\pi r \sigma$ due to the surface tension of the liquid is equal and opposite to the weight of the liquid column h resting on the hole.

Table 1 carries data collected in five experimental tests for checking the reliability of the calculation as well as the value of the angle of contact between the used liquid and the surface of the plate. The tests have been carried out under atmospheric pressure at the temperature of about 20° C. and in the calm air.

TABLE 1

Experimental tests for keeping the static head on perforated plates

| fluid | plate material | hole diameter (mm) | initial hydro-static head (mm) | time for reaching equilibrium (sec) | final hydro-static head (mm) |
|---|---|---|---|---|---|
| $H_2O$ | aluminum thick. 0.5 | 1 | 42 | 45 | emptying |
| $H_2O$ | aluminum thick. 0.5 | 1,2 | 42 | 10 | emptying |
| $H_2O$ + $NH_3$ 30% | aluminum thick. 0.5 | 1 | 42 | 50 | emptying |
| $H_2O$ | teflon thick. 0.5 | 1 | 42 | 15 | 17–18 |
| $H_2O$ + $NH_3$ 30% | teflon thick. 0.5 | 1 | 42 | 16 | 10–11 |

Angle of contact between $H_2O$ and teflon under atmospheric pressure and at 20° C.: $\alpha = 128°$
Angle of contact between $H_2O/NH_3$, 30%, and teflon under atmospheric pressure and at 20° C.: $\alpha = 115°$ As can be seen from the table the convenient selection of the hole diameter in the rectifying plates allows the desired height of the head to be assured in order to grant the necessary enthalpic exchange between liquid and vapor for the rectifying process.

Figure 9:
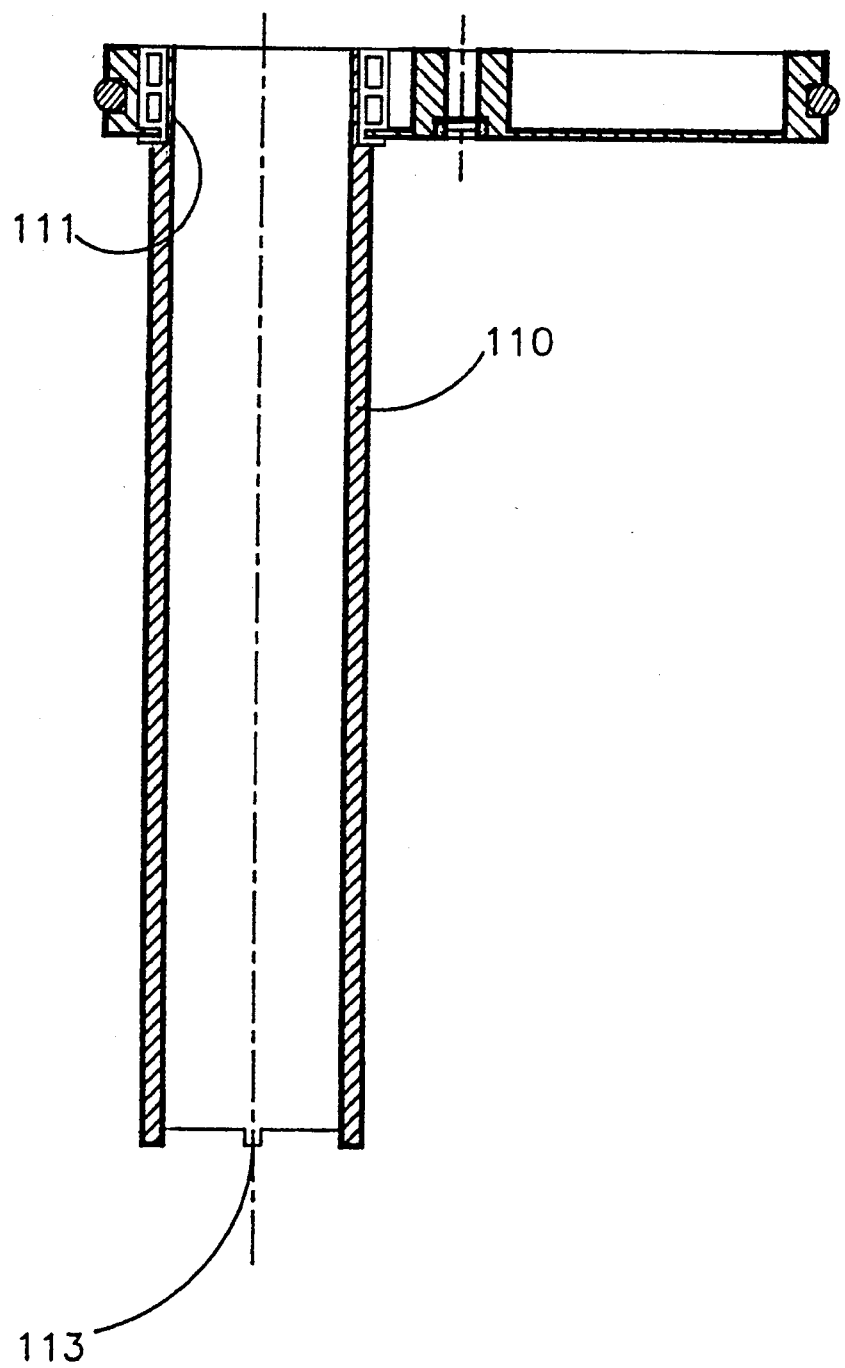
FIG. 9 is a detail of a perforated plate with a weir according to the invention.

The plates both of the exhaustion section 106 and the enrichment section 108 are shown together with their weirs 110 in the rectifying column 12 of FIG. 3a. The enlarged detail of a weir is shown in FIG. 9.

As seen in such figures, weirs 110 are formed of metallic pipes of suitable diameter which are inserted into corresponding holes 111 of the rectifying plates.

The function of the weirs is that of allowing the liquid to pass from the upper plate to the lower plate, thus assuring a descent time such as to allow the liquid to be completely degassed.

In the plate columns of the conventional type such aims is achieved by a suitable hole size.

However, the conventional solution could not allow a reduced flow rate to be kept under steady conditions in the described apparatus because of the need of continuously varying operating conditions. To solve this problem a load loss has been provided at the ends of each weir by teeth 113 spacing it apart from the underlying plate. Such load loss controls the flow rate of the weir as a function of a hydrostatic head internal to the same weir which increases or decreases according to the flow rate of the column to be removed, thus varying the stay time for the degassing.

Figure 7:
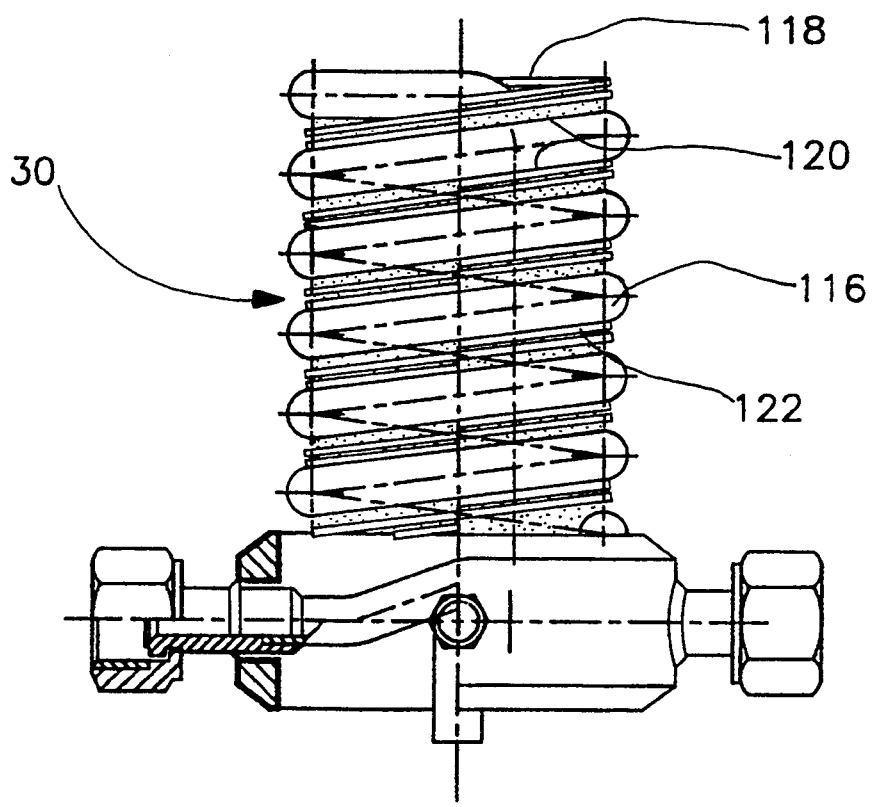
FIG. 7 is a detail of the dephlegmator with the shaved filling.

As far as the partial condenser socalled dephlegmator 30 (FIG. 7) is concerned its efficiency has been increased for the sake of perfectly rectifying the solute by inserting the conventional helicoidal pipe 116, in which the cold liquid is being flowed for the cooling, into a kind of volute formed of a plurality of slotted and overlapped discs 118. Such discs 118 have slots 120 opposed two by two and are twisted by a width equal to the diameter of the helicoidal pipe. Gap 122 between helicoidal pipe and discs is completely filled by metallic shavings of suitable length in order to cause a load loss and to make as short as possible the preferential paths both of the liquid and the vapor. Thus all of the vapor to be rectified establishes contact both with helicoidal pipe and the condensing, percolating liquid.

Metallic shavings are also present in column head 124 in order to avoid or at least to reduce the entrainment of the liquid by the rectified vapor.

In FIG. 4a a further feature is shown relating the vapor outlet 126 at the column head which is oriented upwards in order to reduce the entrainment of the liquid phase at the minimum.

Such vapor is condensed through line 32 in condenser 22 (plate exchanger) and collected into a little storage tank 34 acting both as hydrostatic head and converter of the $NH_3$ concentration in the near saturated solution. This in order to optimize the performance of the absorption heat pump both under maximum power rating and lower power rating.

Valve means 36 of the processing fluid is calibrated to assure a flow rate equal to the amount of processing fluid distilled by the rectifying column at the maximum power rating.

The function of storage tank 34 in the system for controlling the flow rate of the processing fluid as a function of the needed power is as follows.

During the heating operation, when the apparatus is switched on, the burner operates at the maximum power rating and then with the maximum vapor production. The pressure of the apparatus is low; therefore, the flow rate of the processing fluid from valve means 36 will be lower than that of the produced fluid. Under such conditions storage tank 34 will be filled up. Storage tank 34 is suitably dimensioned in order to be full when the mass flow rate of the processing fluid produced by generator 10 is equal to the mass flow rate of the processing fluid from valve means 36.

When the energy requirement is lower than the maximum power rating of the absorption heat pump the amount of thermal energy supplied to generator 10 is decreased by the system for regulating burner 38. As a result the flow rate of the produced processing fluid is reduced.

The decreasing of the inner circulation pressure is not istantaneous or is a little delayed due to the system inertia; therefore, the flow rate of the processing fluid from valve means 36 will be greater than that of the produced fluid, and then the liquid level in storage tank 34 will be decreased.

Thus the mean concentration of the cycling solution is enhanced. The concentration increase allows a certain pressure value to be maintained.

During the cooling operation it is necessary to reduce the load loss of valve means 36 so that the mean concentration of the circulation solution is higher in order to reach a better efficiency of the refrigerating cycle.

This is achieved by providing a bypass 40 controlled by an electrovalve 42 servo controlled in turn by a summer/winter conditioning switch 60 of the absorption heat pump (FIG. 11) which allows the load loss of valve means 36 to be reduced.

The hydrostatic head of storage tank 34 determines the circulation pressure as a function of the temperature of the stored liquid. Such conditions of hydrostatic control allow liquid ammonia in subcooler 25 to be subcooled.

Therefore, the processing fluid is fed under subcooled conditions to valve means 36. A further subcooling of the processing fluid as a result of an adiabatic transformation is caused by the low pressure downstream of said valve means 36.

Valve means 36 is located at the inlet of evaporator 24 where ammonia evaporates and absorbs heat from a low temperature source which in the illustrated embodiment is provided by a circulator 44 of water-ethylene glycol mixture.

As seen in Fig. 10 valve means 36 includes a screw 36a having square thread which is screwed against the force of a spring 36b to a corresponding thread of conduit 36c to which bypass 40 leads between evaporator 24 and subcooler 25. A clearance "g" of suitable size is provided between the male thread of the screw and the female thread for allowing the processing fluid to circulate and any impurity to pass.

As the pressure of the generator acting on the head of the screw increases, the bias of the spring is overcome and the screw traverses the conduit due to the provided clearance, and the flow section of the processing Fluid is proportionally increased so that the load loss is reduced.

Parallel, circular grooves 36d spaced apart from one another and increasing the load loss are provided to form a labyrinth for any impurity which can obstruct the passageway.

A total or partial obstruction could cause the pressure of the generator to be further increased and then the outlet port to be enlarged such as to allow any impurity not held by the filters to be discharged.

Processing fluid traversing subcooler 25 at low temperature but with high enthalpy is heated and causes the subcooling of liquid ammonia from storage tank and then flows to absorber 18 in the same current as the poor solution. Poor solution flows from the bottom of reboiler 14 of the generator. Such solution before flowing to absorber 18 gives its high heat content to the near saturated solution in the solution exchanger 20, and then flows through valve means 46.

Poor solution and ammonia are absorbed by absorber 18 which also develops a high heat of absorption, thus forming a near saturated solution at low temperature. In order not to excessively increase the dimensions and at the same time to keep a high efficiency, absorber 18 carries out the matter exchange admixing vapor and liquid in the same current between two plates including a swirl grid therebetween.

Commercially available absorbers provide a large contact surface between liquid and vapor causing liquid to percolate through an appropriate distributor on a helicoidal pipe which is traversed in countercurrent by a cold fluid for the disposal of the heat of absorption.

Vapor to be absorbed is flowed in the thin liquid film flowing on the helicoidal pipe. The desired solution is collected on the bottom of the tank in which the helicoidal pipe is contained.

Such system requires large volumes and high weights, which prevents it from being used in a compact absorption heat pump intended to domestic utilization as herein requested.

Heat exchangers having a swirl grid have been traded for some time, in which the liquid is passed between parallel plates including grids therebetween in order to cause the fluid to swirl at low rate increasing the heat exchange factor. Such plates are placed in series or in parallel and in countercurrent to a heat exchange liquid.

Advantageously, according to the present invention the use of swirl grids is also extended to the matter exchange so as to provide highly efficient matter exchangers of reduced size and weights for transferring a fluid under the vapor state to a liquid solution poor in the same fluid (absorber).

This has been achieved by providing an absorber having a plurality of plates disposed upon one another, in which the vapor to be absorbed (solute) and the liquid (solvent) are admixed in the same current between couples of plates between which a swirl grid is inserted.

A dispersion of the liquid in the vapor under the form of microdrops increasing the contact surface between solute and solvent is provided along the path due to the presence of such grid.

In order to provide the absorption the heat developed as a consequence of the absorption is subtracted by passing a heat exchange liquid in countercurrent or in the same current along the outer walls of the plates involved in the absorption.

Figure 16:
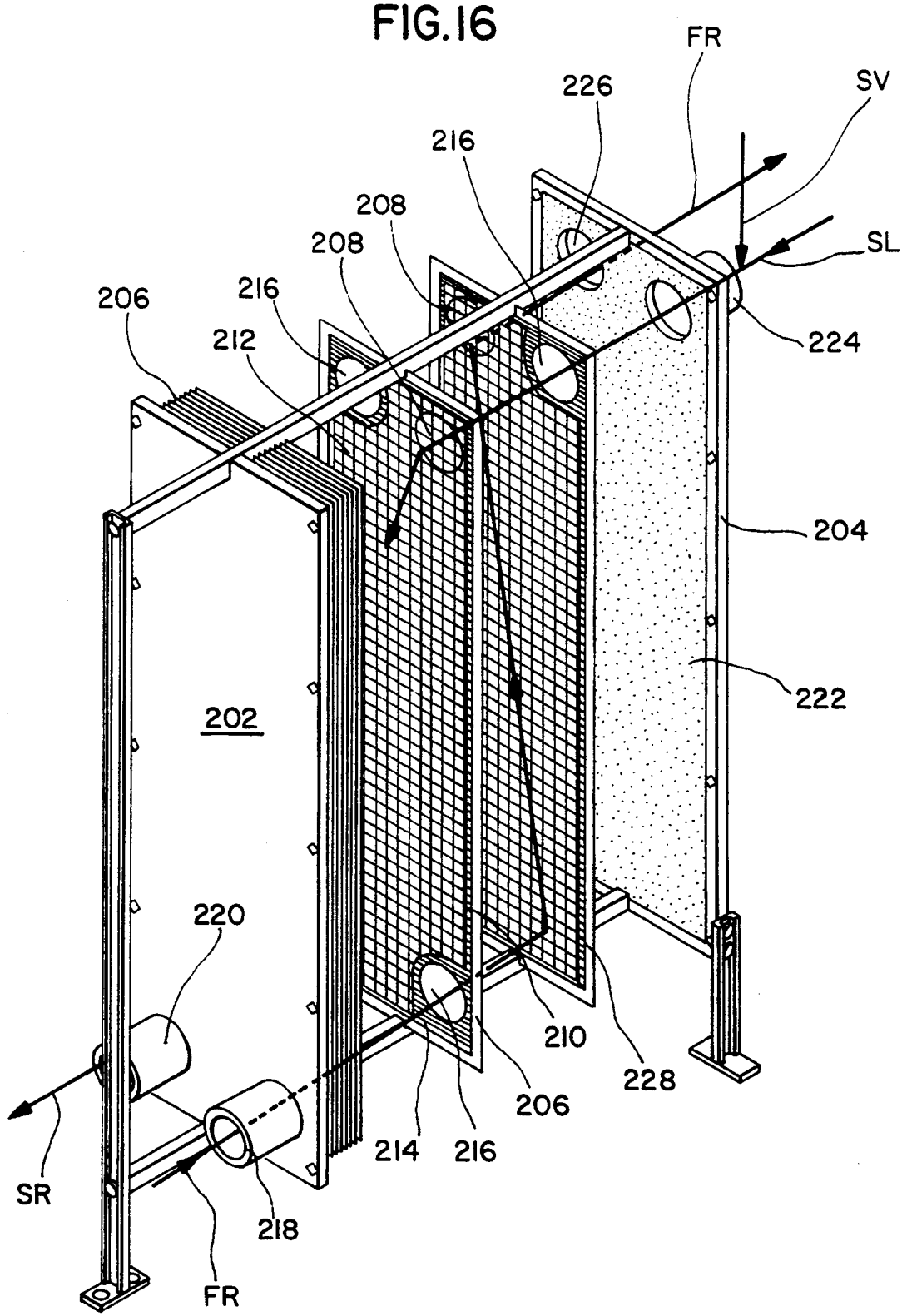
FIG. 16 shows schematically an exploded view of the plate pack of the absorber according to a first embodiment of the invention.
Figure 17:
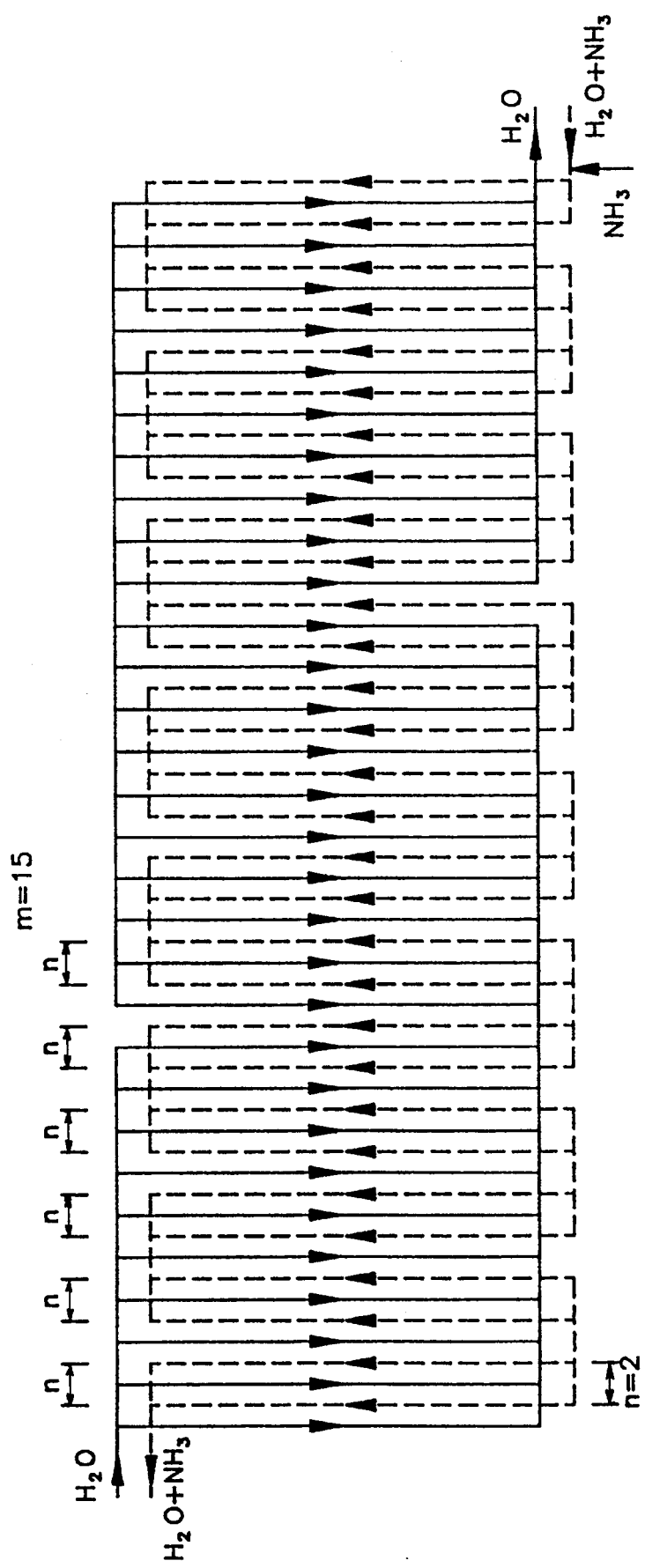
FIG. 17 is a flow diagram relative to the absorption of pure NH₃ in a solution having little ammonia.

More particularly with reference to FIG. 16 absorber 18 includes a pair of outer slabs 202 and 204 between which a plurality of intermediate plates 206 are located, each of them is formed of a rectangular plane foil provided on at least three corners with holes 208 for the fluid circulation. Each foil is provided with peripheral sealing means 210 surrounding a swirl grid 212 and having at two diametrally opposed corners an extension 214 within which a corresponding hole 216 is formed communicating with the hole of the underlying foil. Accordingly, in a pack of plates alternatively overturned with one another the resulting gaps and the corresponding grids are crossed by fluids when holes 216 of a plates are aligned with holes 208 of the adjacent plate, while they are bypassed when holes 216 are aligned with other holes 216 since their sealing means prevents the fluids from overflowing to the grid.

Moving slab 202 has two holes: the first designated by 218 for the inlet of the cooling fluid FR, the second 220 for the outlet of the enriched solution SR. Stationary slab 204, to which rubber plate 222 adheres, has in turn two holes 224 and 226 which are the inlet of the process fluids, i.e. liquid solvent SL and vapor solute SV, and the outlet of cooling fluid FR, respectively. Such slab is facing the smooth surface of an end plate 228 which unlike all of the other plates has only one hole 216 and one hole 208 horizontally aligned upwards.

The whole assembly described above is provided with sealing means not shown as they are known, which seal all of plates of the pack from moving slab 202 to stationary slab 204.

The operation is as follows: process fluids flow into the absorber through stationary slab 204, bypass then plate 228 through hole 216 and traverse the grid of the next plate 206 which is cooled during the absorption process due to the countercurrent flow of the cooling fluid along the grid of plate 228. The fluid is flowed repeatedly along the same way up to final moving slab 202 from which the enriched solution comes out through outlet 220.

By changing the mesh of the metal wire nets a lot of different flow rates of the two fluids can be provided, thus allowing even the smallest flow rate which would be usually laminar to be strongly swirled, if necessary and permitted by the load loss.

In an absorption heat pump it is desirable that the absorber has not too high load loss; to this purpose it is convenient to have "n" flows in parallel in the path of absorption of the solute into the solvent, where "n" is defined as the flow rate of the absorber and depends upon the need of keeping at least a little turbulence in order to assure the dispersion of the microdrops of the solvent in the solute.

The flow in parallel is to be preferred because it assures lower load loss, however, it is not always capable of assuring an efficient heat exchange between cooling fluid and process fluid. In case "n" flows in parallel of the cooling fluid should be followed by "m" flows in series, at the end of the "n" flows a plate with two vertically aligned holes has to be placed.

In FIG. 2 there is shown the flow diagram relative to the absorption of pure ammonia into a solution poor in ammonia, in which the cooling fluid is $H_2O$. From that figure it is apparent that the paths of the two fluids designated with solid lines and dashed lines, respectively, are in countercurrent and/or in direct current according to the design requirements. In the illustrated case there are n=2 flows in parallel for the process fluids which are distributed in series for m times according to the necessity of eliminating the heat produced by the absorption. In the illustrated example m=15.

In order to increase the number of flows in parallel of the process fluid followed by the m flows in series, plates having 4 holes, two up and two down, corresponding to n flows in parallel can be used after the first plate and the plates with three holes.

The low-temperature solution near saturated with ammonia and formed in absorber 18 is transferred through pump 48 from a level of low pressure to the level of high pressure of the absorption heat pump in order to supply rectifying column 12.

Such near saturated solution increases its heat content along the path and then recovers heat within the cycle and cools dephlegmator 30 and the poor solution through solution exchanger 20.

The operating circuits are now briefly disclosed.

The heat of condenser 22 and absorber 18 is removed by a process fluid (water-glycol) which is flowed by a circulator 52 of boiler 38.

Such heat is used during winter both for heating and for the production of hot water for sanitary fixture, and during summer it is used for the production of hot water and for heating a storage tank 88 of the type usually referred to as water heater. The excess is dispersed through a water-air (or water-water) split-exchanger.

Split-exchanger 54 supplies heat to water-glycol circulating in evaporator 24.

According to a peculiar feature of the present invention this can be provided by a multi-way valve 26 allowing the flows to be deviated according to the operating requirements.

Figure 11:
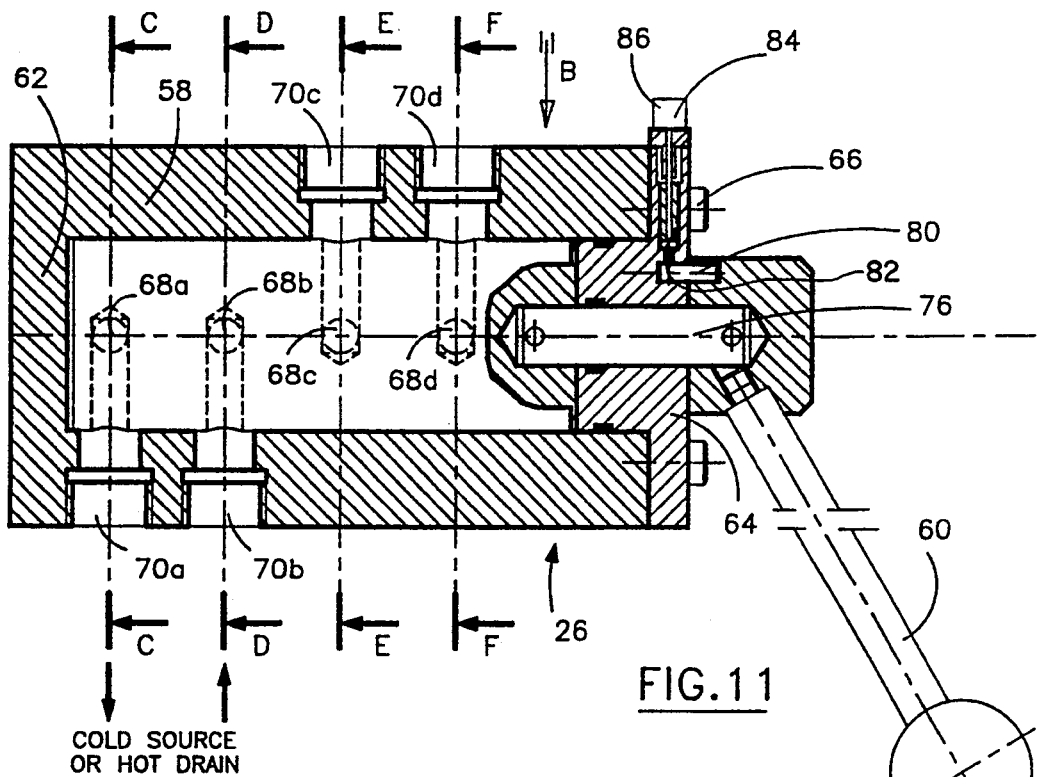
FIG. 11 is a vertical section view of the multi-way valve for summer-winter switching according to the invention.
Figure 15:
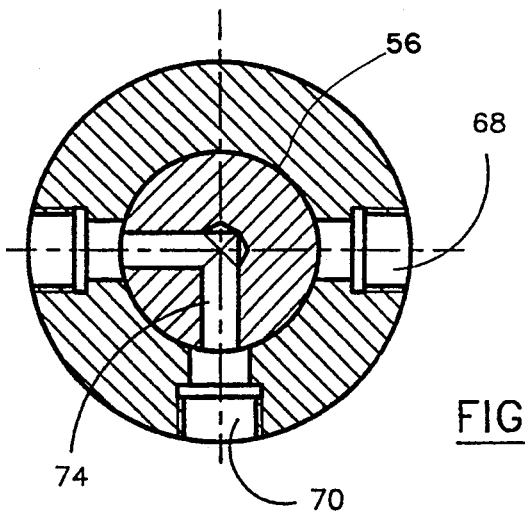
FIGS. 14 and 15 are section views according to line E—E, F—F and C—C, D—D of FIG. 11, respectively.
Figure 12:
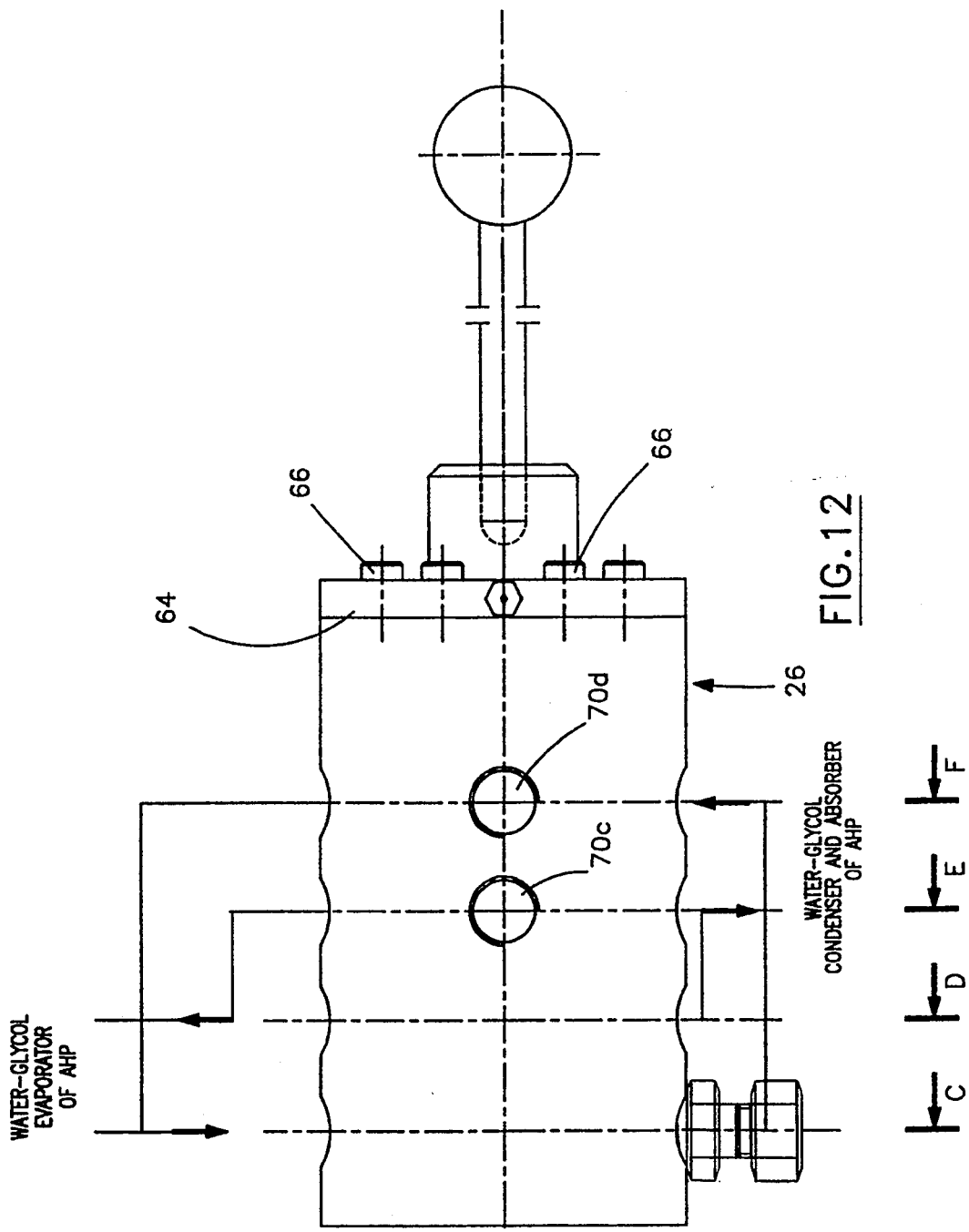
FIG. 12 is a top plan view of the same valve along arrow B of FIG. 11.
Figure 13:
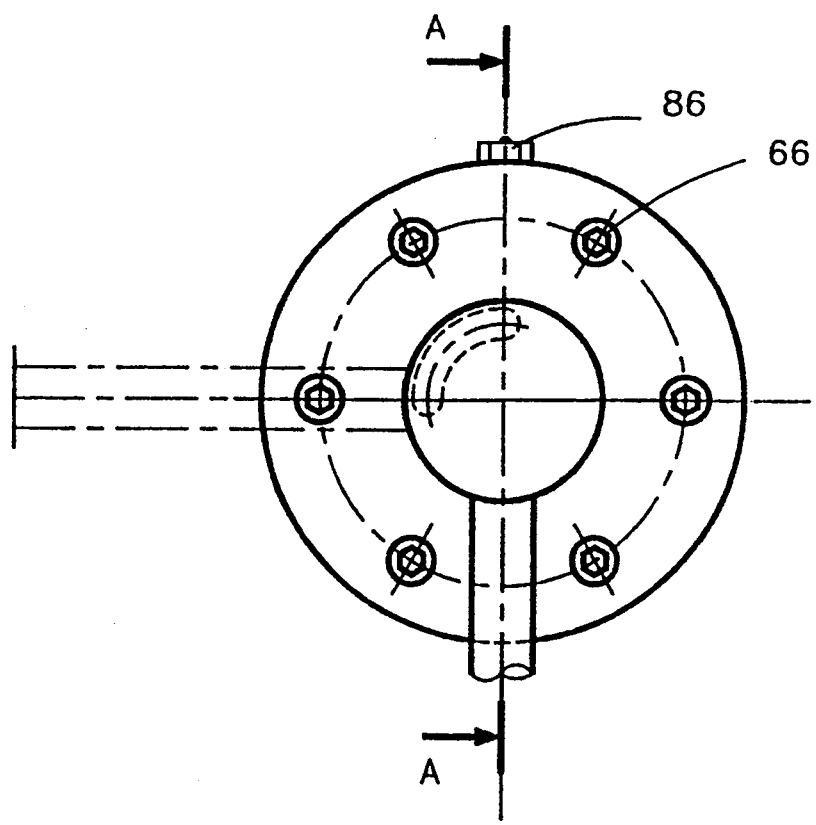
FIG. 13 is a front elevation of the valve of FIG. 12.
Figure 14:
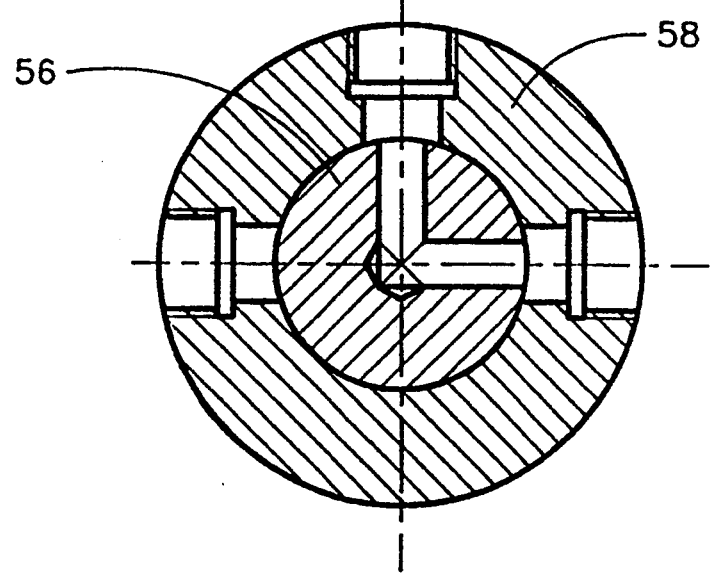

The valve is shown in FIG. 11 and the following. Such valve is substantially formed of a solid cylinder 56 coaxially inserted in a hollow cylinder 58 provided with a bottom 62 and an upper lid 64 fastened by bolts 66 or the like.

Outer cylinder 58 is provided with twelve lateral inlets: two series of four holes 68a, 68b, 68c and 68d, and 68a', 68b', 68c' and 68d' having horizontal axis (i.e. perpendicular to the plane of the drawing sheet of Fig. 11) and being diametrally opposed to one another, and two pairs of holes 70a, 70b and 70c, 70d having vertical axis, i.e. each of a pair of holes disposed side by side and spaced apart by 90° with respect to the preceding holes but placed at the opposite ends of two diametrally opposed generatrices of the same cylinder.

In the inner cylinder 56 four conduits 74 are formed each by two radial holes disposed at 90° to each other and communicating at the centre. The four conduits are disposed so as to connect holes 70 to holes 68 or holes 68' according to the angular rotation.

The angular amplitude of 90° of cylinder 56 is controlled by a rod 60 which is pivoted at one end about an axis 76 rigidly connected to cylinder 56.

The stops of rod 60 are formed from a peg 80 sliding in a slot 82 formed in lid 64.

Such peg 80 acts as a cam at its stop and lifts a rod 84 which in turn operates a microswitch 86 for reversing the operation of the thermostat and for energizing electrovalve 42 of bypass 40.

The operation of multi-way valve is as follows.

During winter user 90, for example a fan-corrector, is connected to hot water produced by the condenser and the absorber of the absorption heat pump. At the same time water-glycol circulating in evaporator 24 is fed to split-exchanger 54.

Conversely, during summer user 90 is connected to evaporator 24 and cooling water of the condenser and the absorber is fed to split-exchanger 54.

It should be noted that the described valve is not limited to the use with the heat pump of the invention but can be applied in a number of water-water absorption heat pump provided that the operation is reversible.

From the foregoing the advantages of the invention are soon apparent:
- the system has small dimension and weight, and its management is related to the use of a wall gas boiler;
- the process fluid (water-ammonia solution) is indirectly heated with high heat exchange factors;
- the heat pump can be coupled through multi-way valve to any commercial heat split-exchanger which performs the function of cold source during winter and the function of hot drain during summer without any modification.

The present invention has been illustrated and described according to a preferred embodiment thereof but it should be understood that construction changes can be made by those skilled in the art without departing from the scope of the present industrial invention.

I claim:

1. Absorption heat pump for heating or refrigerating buildings and for delivering in combination hot water for sanitary fixtures, comprising:
a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer, said storage tank of the processing fluid performing the function both of hydrostatic head and changer of the concentration of the solute in the near saturated solution by regulating the cycle pressure for optimizing the efficiency under partial load conditions.

2. The heat pump of claim 1, wherein the multi-way valve can be controlled directly by the user so as to connect the latter during winter to the cooling circuit of the condenser and the absorber, thus allowing the heat removed from said components to be used for the environment heating and for the production of hot water for sanitary fixtures, and to connect during summer the user to the exchange circuit of the evaporator and the cooling circuit of the condenser and the absorber to the split-exchanger, respectively.

3. Absorption heat pump for heating or refrigerating buildings and for delivering in combination hot water for sanitary fixtures, comprising:

a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer, said second valve means including a screw and a nut thread having a clearance among the threads varying as a function of the differential pressure between downstream and upstream pressures of the same valve means by overcoming the bias of a spring so as to increase the flow section of the processing fluid and decreasing the load loss.

4. The heat pump of claim 3, wherein said second valve means also allows the flow rate to be controlled by changing the flow section of the processing fluid as a function of said differential pressure.

5. The heat pump of the claim 4, wherein said second valve means has also the function of discharging any impurity because it causes the drain of such impurities to be a function of any differential pressure by increasing the flow section of the processing fluid.

6. Absorption heat pump for heating or refrigerating buildings and for delivering in combination hot water for sanitary fixtures, comprising:

a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer, in order to provide a higher mean concentration of the circulating solution during summer the load loss of the second valve means is reduced by a bypass controlled by an electrovalve which is servo-controlled by the manual summer/winter control switch of the heat pump, i.e. by the manual multi-way valve control.

7. Absorption heat pump for heating or refrigerating buildings and for delivering in combination hot water for sanitary fixtures, comprising:

a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer, said process fluid being a water-ammonia solution.

8. The heat pump of claim 6, wherein the manual control of the multi-way valve actuates a cam which operates a microswitch for reversing the operation of a thermostat if the heat pump is programmed to operate at room temperature.

9. Absorption heat pump for heating or refrigerating buildings and for delivering in combination hot water for sanitary fixtures, comprising:

a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer, said vapor generator of the processing fluid including a reboiler, a rectifying column having perforated plates with wires with hydrostatic head, and a high-efficiency partial condenser or dephlegmator.

10. The heat pump of claim 9, wherein the hydrostatic head on the plates of the rectifying column is provided by using for the plates wader-proofing material, and that the desired height of said head for any used liquid depends on the diameter of the holes in the plates.

11. The heat pump of claims 10, wherein after the first starting the hydrostatic head on the plates of the rectifying column allows the operation to be restarted after having been discontinued without any delay for achieving the optimum steady conditions.

12. Absorption heat pump for heating or refrigerating buildings and for delivering in combination hot water for sanitary fixtures, comprising:

a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer, said generator including a dephlegmator having a helicoidal pipe in which the cold liquid for the cooling is flowing, said helicoidal pipe is an endless screw formed of a plurality of superimposed discs provided with slots opposed two by two and twisted by an amplitude corresponding to the diameter of the helicoidal pipe.

13. The heat pump of claim 10, wherein the free gaps among discs and helicoidal pipes are filled with metal shavings which increase the load loss and reduce the preferential paths both of the liquid and the vapor to the minimum.

14. The heat pump of claim 13, wherein also the top of the rectifying column is filled with metal shavings in order to avoid or at least to reduce the entrainment of the liquid phase by the vapor to the minimum.

15. The heat pump of claim 9, wherein the weirs on the rectifying plates are provided with teeth spacing them apart from the underlying plate in order to cause a load loss capable to assure a sufficient degassing time.

16. The heat pump of claim 1, wherein in order to prevent fire from contacting containers under pressure the bottom of the reboiler is lined with a tank where the vapor of propylene glycol produced by said boiler condenses.

17. The heat pump of claim 1, wherein the boiler which transfers heat to the reboiler is a wall gas boiler.

18. The heat pump of claim 1, wherein all of the heat exchangers are compact plate exchangers.

19. Absorption heat pump for heating or refrigerating buildings and for delivering in combination hot water for sanitary fixtures, comprising:

a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer and a storage tank of hot water which during summer makes use of a part of the heat produced by the operating cycle otherwise destined to the outside.

20. Absorption heat pump for heating or refrigerating buildings and for delivering in combination hot water for sanitary fixtures, comprising:

a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer, said multi-ways valve including:

a stationary, hollow cylindrical valve body provided with a first series of uniformly sized four holes in said valve body and a second series of four holes in said valve body diametrically opposed to said first series and two pairs of holes, each of said pairs being disposed at the opposite ends of two generatrices angularly spaced by 90° with respect to the series of the preceding holes, and an inner cylindrical body which is rotatable within said valve body and in which four conduits are formed each by two radial holes at 90° to each other and communicating at the center, said four conduits being located so as to connect said pairs of second holes with the first or the second series of first four holes of the outer valve body, respectively, as a result of an angular rotation by 90° of said inner body.

21. Absorption heat pump for heating or refrigerating buildings and for delivering in combination hot water for sanitary fixtures, comprising:

a generator to bring the processing fluid to the vapor state, a boiler to supply said generator with heat, a condenser for the processing fluid vapor coming from said generator, a storage tank for the processing fluid condensed from said condenser, a subcooler for said condensed processing fluid, an absorber where the pure processing fluid is absorbed into the poor solution from the generator to provide a near saturated solution, a pump for the near saturated solution for delivering such solution to the generator, a first valve means for passing the poor solution from said generator to said absorber, a heat exchanger for exchanging heat between the near saturated solution and the poor solution, a second valve means for subcooled condensed processing fluid coming from said tank, means for reducing load loss of said second valve means during summer, an evaporator receiving heat from a low-temperature source to evaporate processing fluid passing through said second valve means, and a multi-way valve allowing said heat pump to be coupled with a split-exchanger by deviating the flows of the processing fluid according to the season so as to cause said split-exchanger to perform the function of a cold source during the winter and the function of a hot drain during the summer, said absorber, where the pure processing fluid is absorbed in the poor solution for producing a near saturated solution, being formed by a pack of plates among which swirl grids are interposed in a corresponding number, in which the solute (processing fluid) in the vapor state and the solvent (solution poor in $NH_3$) in the liquid state are fed in direct current for providing a dispersion of microdrops of said solvent in the solute at said grids.

22. The heat pump of claim 21, wherein the absorption heat in the absorber is removed by a fluid of heat exchange circulating current along the outer surfaces of the plates limiting the process liquid.

23. The heat pump of claim 21, wherein in order to reduce the load loss in the absorber the path of absorption of the solute into the solvent is formed of flows in parallel and flows in series under the same exchange surfaces and the same flow section of any single plate.

24. The heat pump of claim 23, wherein the number of flows in parallel depends on the amount of the material to be absorbed and on the need of keeping a turbulence condition which assures the dispersion of the solute in microdrops.

25. The heat pump of claim 23, wherein the number of flows in parallel is between 1 and 6.

26. The heat pump of claim 22, wherein the plates of the absorber both are in parallel and in series, and the inlet and outlet collectors of the process fluid and the cooling fluid are located at both ends of the pack of plates.

27. The heat pump of claim 1, wherein the heat carrier fluid is a water-glycol solution.

28. The heat pump of claim 21, wherein the inlet and outlet collectors of the process fluid can be located at only one end of the pack of plates.

* * * * *